United States Patent
Roddy et al.

(10) Patent No.: US 6,648,475 B1
(45) Date of Patent: Nov. 18, 2003

(54) METHOD AND APPARATUS FOR INCREASING COLOR GAMUT OF A DISPLAY

(75) Inventors: James E. Roddy, Rochester, NY (US); Robert J. Zolla, Rochester, NY (US); William R. Markis, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/151,742

(22) Filed: May 20, 2002

(51) Int. Cl.[7] .............................................. G03B 21/14
(52) U.S. Cl. .......................................... 353/31; 353/94
(58) Field of Search ............................... 353/31, 33, 37, 353/94; 349/8; 348/742, 743, 750, 751, 754, 757

(56) References Cited

U.S. PATENT DOCUMENTS

| | | | |
|---|---|---|---|
| 4,368,963 A | * 1/1983 | Stolov | 353/31 |
| 4,441,791 A | 4/1984 | Hornbeck | |
| 5,535,047 A | 7/1996 | Hornbeck | |
| 5,537,258 A | 7/1996 | Yamazaki et al. | |
| 5,570,213 A | 10/1996 | Ruiz et al. | |
| 5,600,383 A | 2/1997 | Hornbeck | |
| 5,620,755 A | 4/1997 | Smith, Jr. et al. | |
| 5,719,695 A | 2/1998 | Heimbuch | |
| 5,812,223 A | * 9/1998 | Noguchi | 349/9 |
| 5,828,424 A | 10/1998 | Wallenstein | |
| 5,879,065 A | * 3/1999 | Shirochi et al. | 353/8 |
| 5,914,818 A | 6/1999 | Tejada et al. | |
| 5,930,050 A | 7/1999 | Dewald | |
| 5,982,992 A | 11/1999 | Waldron | |
| 6,008,951 A | 12/1999 | Anderson | |
| 6,020,937 A | 2/2000 | Bardmesser | |
| 6,053,615 A | 4/2000 | Peterson et al. | |
| 6,089,717 A | 7/2000 | Iwai | |
| 6,122,103 A | 9/2000 | Perkins et al. | |
| 6,147,720 A | 11/2000 | Gurerinot et al. | |
| 6,191,826 B1 | 2/2001 | Murakami et al. | |
| 6,191,893 B1 | * 2/2001 | Bradley | 359/634 |
| 6,220,710 B1 | 4/2001 | Raj et al. | |
| 6,220,713 B1 | 4/2001 | Tadic-Galeb et al. | |
| 6,254,237 B1 | 7/2001 | Booth | |
| 6,256,073 B1 | 7/2001 | Pettitt | |
| 6,276,801 B1 | * 8/2001 | Fielding | 353/31 |
| 6,280,034 B1 | 8/2001 | Brennesholtz | |
| 6,392,717 B1 | * 5/2002 | Kunzman | 348/744 |
| 6,567,134 B1 | * 5/2003 | Morgan | 348/743 |
| 6,568,811 B2 | * 5/2003 | Noda et al. | 353/31 |

FOREIGN PATENT DOCUMENTS

| | | |
|---|---|---|
| EP | 586139 A2 | 8/1993 |
| WO | 01/95544 A2 | 12/2001 |

* cited by examiner

*Primary Examiner*—William Dowling
(74) *Attorney, Agent, or Firm*—Nelson Adrian Blish

(57) ABSTRACT

A method and projection system (10) for increasing the color gamut of images projected onto a display surface (140) by using four or more light sources (12), where the light sources (12) are selected for high brightness and narrow wavelength characteristics and are selected from optimal wavelengths for color gamut expansion. Light sources (12) for large-scale projection environments are preferably lasers. Smaller systems may employ LEDs or other relatively saturated, relatively bright light sources (12).

46 Claims, 10 Drawing Sheets

METHOD AND APPARATUS FOR INCREASING COLOR GAMUT OF A DISPLAY

FIELD OF THE INVENTION

This invention generally relates to imaging apparatus for display of images from digital data and more particularly relates to an apparatus and method for improving the color gamut of projected high-resolution motion picture images.

BACKGROUND OF THE INVENTION

A number of different color spaces have been used to describe the human visual system. In one attempt to define a workable color space, Commission Internationale de l'Eclairage (International Commission on Illumination) developed the CIE Chromaticity Diagram, published in 1931. The CIE color model employed the tristimulus values X, Y, Z based on a standard human observer. The diagram in x and y was later modified to a u' and v' diagram in which equal distances on the diagram represent equal perceived color shifts. Useful background discussion of color perception and color models can be found in Billmeyer and Saltzmann's *Principles of Color Technology*, Third Edition, Wiley and Sons, and in Dr. R. W. G. Hunt's *The Reproduction of Color*, Fifth Edition, Fountain Press, England.

FIG. 1 shows a familiar color gamut representation using CIE 1976 L*u*v* conventions, with the perceived eye-brain color gamut in u'-v' coordinate space represented as a visible gamut 100. Pure, saturated spectral colors are mapped to the "horseshoe" shaped periphery of visible gamut curve 100. The interior of the "horseshoe" contains all mappings of mixtures of colors, such as spectral red with added blue, which becomes magenta, for example. The interior of the horseshoe can also contain mixtures of pure colors with white, such as spectral red with added white, which becomes pink, for example. The overall color area defined by the "horseshoe" curve of visible gamut 100 is the full range of color perceptible to the human visual system. It is desirable to represent as much as possible of this area in a color display to come as close as possible to representing the original scene as we would perceive it if we were actually viewing it.

Conventional motion picture display, whether for large-scale commercial color projection from film or for color television cathode ray tubes (CRTs), operates within a fairly well-established color gamut. Referring again to the mapping of FIG. 1, observe that visible gamut 100 shows the full extent of human-perceivable color that, in theory, could be represented for motion picture display. A motion picture film gamut 102 is mapped out within visible gamut 100, showing the reduced extent of color representation achievable with conventional film media. An NTSC TV gamut 104 shows the further restriction placed on achievable colors using conventional color CRT phosphors. It is instructive to note that, because the colors of the CRT phosphors for NTSC TV gamut 104 are not typically saturated, the points defining the color of each phosphor do not lie on the periphery of visible gamut 100. Hence, for example, colors such as turquoise and neon orange can be perceived by the eye in the actual scene but are beyond the color capability of a CRT phosphor system. As is clear from FIG. 1, the range of colors that can be represented using conventional film or TV media falls far short of the full perceivable range of visible gamut 100.

The component colors used for conventional motion picture film employ red, green, and blue dyes (or their complementary counterparts cyan, magenta, and yellow). Component colors for conventional color television CRTs employ red, green, and blue phosphors. Although initially limited in the colors that they could represent, apparatus using these dyes and phosphors have been steadily improved. However, as is clear from the gamut mapping represented in FIG. 1, there is still room for improvement in approximating visible gamut 100 in both motion picture and TV environments.

With the advent of digital technology and the demonstration of all-digital projection systems, there is renewed interest in increasing the range or gamut of colors that can be displayed in order to provide a more realistic, more vivid image than is possible with the gamut limitations of film dyes or phosphors. The most promising solutions for digital cinema projection employ, as image forming devices, one of two types of spatial light modulators (SLMs). A spatial light modulator can be considered essentially as a two-dimensional array of light-valve elements, each element corresponding to an image pixel. Each array element is separately addressable and digitally controlled to modulate transmitted or reflected light from a light source. There are two salient types of spatial light modulators that are conventionally employed for forming images in digital projection and printing apparatus: digital micromirror devices (DMDs) and liquid crystal devices (LCDs).

Texas Instruments has demonstrated prototype projectors using one or more DMDs. DMD devices are described in a number of patents, for example U.S. Pat. Nos. 4,441,791; 5,535,047; and 5,600,383 (all to Hornbeck); and U.S. Pat. No. 5,719,695 (Heimbuch). Optical designs for projection apparatus employing DMDs are disclosed in U.S. Pat. No. 5,914,818 (Tejada et al.); U.S. Pat. No. 5,930,050 (Dewald); U.S. Pat. No. 6,008,951(Anderson); and U.S. Pat. No. 6,089,717 (Iwai). LCD devices are described, in part, in U.S. Pat. No. 5,570,213 (Ruiz et al.) and U.S. Pat. No. 5,620,755 (Smith, Jr. et al.).

While there has been some success with respect to color representation using spatial light modulators, there is a long-felt need for a further broadening of the projection color gamut that will enhance special effects and heighten the viewing experience.

Faced with a similar problem of insufficient color gamut, the printing industry has used a number of strategies for broadening the relatively narrow gamut of pigments used in process color printing. Because conventional color printing uses light reflected from essentially white paper, the color representation methods for print employ a subtractive color system. Conventionally, the process colors cyan (blue+green), magenta (red+blue), and yellow (red+green) are used for representing a broad range of colors. However, due to the lack of spectral purity of the pigment, combinations of cyan, magenta, and yellow are unable to yield black, but instead provide a dark brown hue. To improve the appearance of shadow areas, black is added as a fourth pigment. As is well known in the printing arts, further refined techniques, such as undercolor removal could then be used to take advantage of less expensive black pigments in full-color synthesis. Hence, today's conventional color printing uses the four color CMYK (cyan, magenta, yellow, and black) method described above.

However, even with the addition of black, the range of colors that can be represented by printing pigments is limited. There remain specialized colors such as metallic gold or silver, or specific colors such as those used for corporate identity in logos and packaging, for example, that cannot be adequately reproduced using the CMYK "process color" system. To meet this need, a fifth pigment can be added to a selected print run in order to provide "spot color" over specific areas of an image. Using this technique, for example, many companies use special color inks linked to a product or corporate identity and use these colors in packaging, advertising, logos, and the like, so that the consumer recognizes a specific product, in part, by this special color. This type of solution, while not increasing the overall color gamut of a printing process, at least allows the reproduction of one or more out-of-gamut colors.

Colors in addition to the conventional CMYK process color set have been employed to extend the overall color gamut in printing applications. For example, EP 0 586 139 (Litvak) discloses a method for expanding the conventional color gamut using the four-color CMYK space to a color space using five or more colors.

Referring back to FIG. 1, it is instructive to note that the color gamut is essentially defined by a polygon, wherein each vertex corresponds to a substantially pure color source used as a component color. The area of the polygon corresponds to the size of the color gamut. To expand the color gamut requires moving one or more of these vertices closer to the outline of visible gamut 100. Thus, for example, addition of a color that is inside the polygon defining the color gamut does not expand the color gamut. For example, U.S. Pat. No. 5,982,992 (Waldron) discloses using an added "intra-gamut" colorant in a printing application. However, as noted in the specification of U.S. Pat. No. 5,982,992, this method does not expand the color gamut itself, but can be used for other purposes, such as to provide improved representation of pastels or other colors that are otherwise within the gamut but may be difficult to represent using conventional colorants.

Conventional tristimulus color models, such as the CIE LUV model noted above, represent each individual color as a point in a three-dimensional color space, typically using three independent characteristics such as hue, saturation, and brightness, that can be represented in a three-dimensional coordinate space. Color data, such as conventional image data for a pixel displayed on a color CRT, is typically expressed with three color components (for example R, G, B). Conventional color projection film provides images using three photosensitized emulsion layers, sensitive to red, blue, and green illumination. Because of these conventional practices and image representation formats, developers of digital projection systems understandably adhere to a tristimulus or three-color model. Conforming with conventional practices, designers use various solutions for providing color source illumination, such as filtering a bright white light source through dichroic optics to obtain red, green, and blue component colors for full color image projection. For example, U.S. Pat. No. 6,053,615 (Peterson et al.); U.S. Pat. No. 6,220,713 (Tadic-Galeb et al.); and U.S. Pat. No. 6,254,237 (Booth) are just a few examples of projector designs using this approach.

Some projection solutions employing more than three color light sources have been proposed. However, most of the proposed designs have not targeted color gamut expansion. Disclosures of projectors using more than three color sources include U.S. Pat. No. 6,256,073 (Pettit) discloses a projection apparatus using a filter wheel arrangement that provides four colors in order to maintain brightness and white point purity. However, the fourth color added in this configuration is not spectrally pure, but is white in order to add brightness to the display and to minimize any objectionable color tint. It must be noted that white is analogous to the "intra-gamut" color addition noted in the printing application of U.S. Pat. No. 5,982,992; in terms of color theory, adding white actually reduces the color gamut. Similarly, U.S. Pat. No. 6,220,710 (Raj et al.) discloses the addition of a white light channel to standard R, G, B light channels in a projection apparatus. As noted above, the addition of white light may provide added luminosity, but constricts the color gamut.

U.S. Pat. No. 6,191,826 (Murakami et al.) discloses a projector apparatus that uses four colors derived from a single white light source, where the addition of a fourth color, orange, compensates for unwanted effects of spectral distribution that affect the primary green color path. In the apparatus of U.S. Pat. No. 6,191,826, the specific white light source used happens to contain a distinctive, undesirable orange spectral component. To compensate for this, filtering is used to attenuate undesirable orange spectral content from the green light component in order to obtain a green light having improved spectral purity. Then, with the motive of compensating for the resulting loss of brightness, a separate orange light is added as a fourth color. The disclosure indicates that some expansion of color range is experienced as a side effect. However, with respect to color gamut, it is significant to observe that the solution disclosed in U.S. Pat. No. 6,191,826 does not appreciably expand the color gamut of a projection apparatus. In terms of the color gamut polygon described above with reference to FIG. 1, addition of an orange light may add a fourth vertex, however, any added orange vertex would be very close to the line already formed between red and green vertices. Thus, the newly formed gamut polygon will, at best, exhibit only a very slight increase in area over the triangle formed using three component colors. Moreover, unless a pure wavelength orange is provided, with no appreciable leakage of light having other colors, there could even be a small decrease in color gamut using the methods disclosed in U.S. Pat. No. 6,191,826.

U.S. Pat. No. 6,147,720 (Guerinot et al.) discloses a six-color projection system having an expanded color gamut. However, the method disclosed in U.S. Pat. No. 6,147,720 has a number of disadvantages. This system requires a complex spinning color filter wheel that alternately transmits and reflects, with lamps switching on and off at very fast rates to provide source illumination without flicker. It would be difficult to obtain a good extinction ratio when using lamps switched on and off at the necessary rates. Even with multiple light sources, such an approach has inherent inefficiencies due to dead time from color wheel transitions. As a result, any resulting brightness gains are mitigated by timing constraints.

U.S. Pat. No. 6,280,034 (Brennesholtz) discloses an imaging system using a white light source and selective polarization components to provide both conventional RGB colors and complementary cyan, magenta, and yellow (CMY) source illumination. However, as is shown in the disclosure of U.S. Pat. No. 6,280,034, the addition of these intra-gamut complementary CMY colors may not appreciably broaden the gamut, but helps to augment colors already within gamut and to improve luminance over white-light-added RGB solutions.

Thus, it can be seen that, with respect to projection apparatus, there have been solutions using more than three colors, however, these solutions illustrate the difficulty of obtaining both an expanded color gamut and the necessary brightness for large-scale projection. As is seen with many of the solutions listed above, there can even be some loss of color gamut with the addition of a fourth color.

In contrast to the above patent disclosures, PCT Patent Application WO 01/95544 A2 (Ben-David et al.) discloses a display device and method for color gamut expansion using four or more substantially saturated colors. In one embodiment, application WO 01/95544 teaches the use of a color wheel for providing each of the four or more component colors to a single spatial light modulator. In an alternate embodiment, this application teaches splitting light from a single light source into four or more component colors and the deployment of a dedicated spatial light modulator for each component color. However, while the teaching of application WO 01/95544 may show devices that provide improved color gamut, there are several drawbacks to the conventional design solutions disclosed therein. When multiplexing a single spatial light modulator to handle more than three colors, a significant concern relates to the timing of display data. The spatial light modulator employed must provide very high-speed refresh performance, with high-speed support components in the data processing path. Parallel processing of image data would very likely be required in order to load pixel data to the spatial light modulator at the rates required for maintaining flicker-free motion picture display. It must also be noted that the settling time for conventional LCD modulators, typically in the range of 10–20 msec for each color, further shortens the available projection time and thus constrains brightness. Moreover, the use of a filter wheel for providing the successive component colors at a sufficiently high rate of speed has further disadvantages. Such a filter wheel must be rotated at very high speeds, requiring a precision control feedback loop in order to maintain precision synchronization with data loading and device modulation timing. The additional "dead time" during filter color transitions, already substantial in devices using three-color filter wheels, would further reduce brightness and complicate timing synchronization. Coupling the filter wheel with a neutral density filter, also rotating in the light path, introduces additional cost and complexity. Such practical concerns raise doubts as to the feasibility and practicality of the filter wheel design approach taught in application WO 01/95544. Alternative solutions using a spatial light modulator dedicated to each color introduce other concerns, including proper alignment for component colors. The disclosure of application WO 01/95544 teaches the deployment of a separate projection system for each color, which would be costly and require separate alignment procedures for each display screen size and distance. Providing illumination from a single light source results in reduced brightness and contrast. Thus, while the disclosure of application WO 01/95544 teaches gamut expansion in theory, in practice there are a number of significant drawbacks to the design solutions proposed. Problems that were difficult to solve for three-color projection, such as timing synchronization, color alignment, and maintaining brightness and contrast, are even more challenging when attempting to use four or more component colors. Moreover, conventional color-combining devices such as X-cubes, X-prisms, or Philips prisms, having input axes for only three source colors, cannot be readily used in an apparatus using more than three colors.

Referring back to FIG. 1, it is instructive to note that the broadest possible gamut is achieved when component colors, that is, colors represented by the vertices of the color gamut polygon, are spectrally pure colors. In terms of the gamut mapping of FIG. 1, a spectrally pure color would be represented as a single point lying on the boundary of the curve representing visible gamut 100. As is well known in the optical arts, lasers inherently provide light sources that exhibit spectral purity. For this reason, lasers are considered as suitable light sources for digital color projection. In some conventional designs, laser beams are modulated and combined and then raster scanned using electromechanical high speed vertical and low speed horizontal scanners. These scanners typically comprise spinning polygons for high speed scanning and galvanometer driven mirrors for low speed deflection. Vector scan devices that write "cartoon character" outlines with two galvanometer scanners have long been on the market for large area outdoor laser displays, for example. Lasers have also been used with spatial light modulators for digital projection. As one example, U.S. Pat. No. 5,537,258 (Yamazaki et al.) discloses a laser projection system with red, green, and blue dye lasers providing the primary colors for forming an image using a single shared spatial light modulator.

There have been proposed solutions using more than three lasers within a projector where the additional laser serves a special purpose other than color projection. For example, U.S. Pat. No. 6,020,937 (Bardmesser) discloses a TV display system using as many as four color lasers, however, the fourth laser provides an additional source for achieving increased scan speed and is not a fourth color source. The use of a fourth pump laser is noted in U.S. Pat. No. 5,537,258 cited above and in U.S. Pat. No. 5,828,424 (Wallenstein), which discloses a color projection system that uses a pump laser source with frequency multipliers to excite projection lasers having the conventional R, G, B colors. Again, this use of a fourth laser does not add a fourth projection color.

In summary, it can be seen that, with respect to projection apparatus, while there have been solutions proposed for using more than three colors, only the teaching of application WO 01/95544 is directed to expanding the color gamut. Other approaches that add color tend to narrow the available color gamut. Moreover, with a projection apparatus having more than three colors, conventional design approaches do not appear to be feasible, practical, or economical.

In order for digital color projection to compete with conventional film projection technology, it would be advantageous to provide a digital projection apparatus that provides a color gamut having a wider range of colors than can presently be represented, without sacrificing brightness and contrast. It is desirable to increase the gamut of colors displayed to approximate, even more closely than with existing projection apparatus, the color gamut of the human eye.

SUMMARY OF THE INVENTION

It is an object of the present invention to provide an apparatus and method for digital projection having an expanded color gamut. Briefly, according to one aspect of the present invention a color projection system comprises:

(a) a first light source for providing a first color beam;

(b) a first spatial light modulator for modulating the first color beam to provide a first modulated color beam on a first optical axis;

(c) a second light source for providing a second color beam;

(d) a second spatial light modulator for modulating the second color beam to provide a second modulated color beam on a second optical axis;

(e) a third light source for providing a third color beam for transmission through a first color combiner;

(f) a third spatial light modulator for modulating the third color beam to provide a third modulated color beam;

(g) a fourth light source for providing a fourth color beam for reflection by said first color combiner;

(h) a fourth spatial light modulator for modulating the fourth color beam to provide a fourth modulated color beam;

(i) a polarizing beamsplitter for combining the third and fourth modulated color beams onto a third optical axis;

(j) a second color combiner for combining the light on the first, second, and third optical axes to form a multicolor modulated beam; and (k) a projection system for projecting the multicolor modulated beam toward a display surface.

A feature of the present invention is the use of light sources having a high degree of spectral purity in order to provide the fullest possible color gamut. Lasers, because they are inherently color saturated, are the light sources used in the preferred embodiment.

It is an advantage of the present invention that it provides an apparatus capable of achieving wider color gamut for displaying digital motion pictures when compared with conventional three-color laser and arc lamp based equipment. This allows the display of colors that were not possible with previous systems.

It is an advantage of the present invention that it employs laser light, which is inherently polarized. Thus, there is no need for filtering or polarization of the laser light when directed toward an LCD spatial light modulator, and no consequent filter losses. In addition, because lasers provide a high degree of spectral purity, a wider color gamut can be obtained.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Theoretical Background for Expanding Color Gamut

Figure 1:
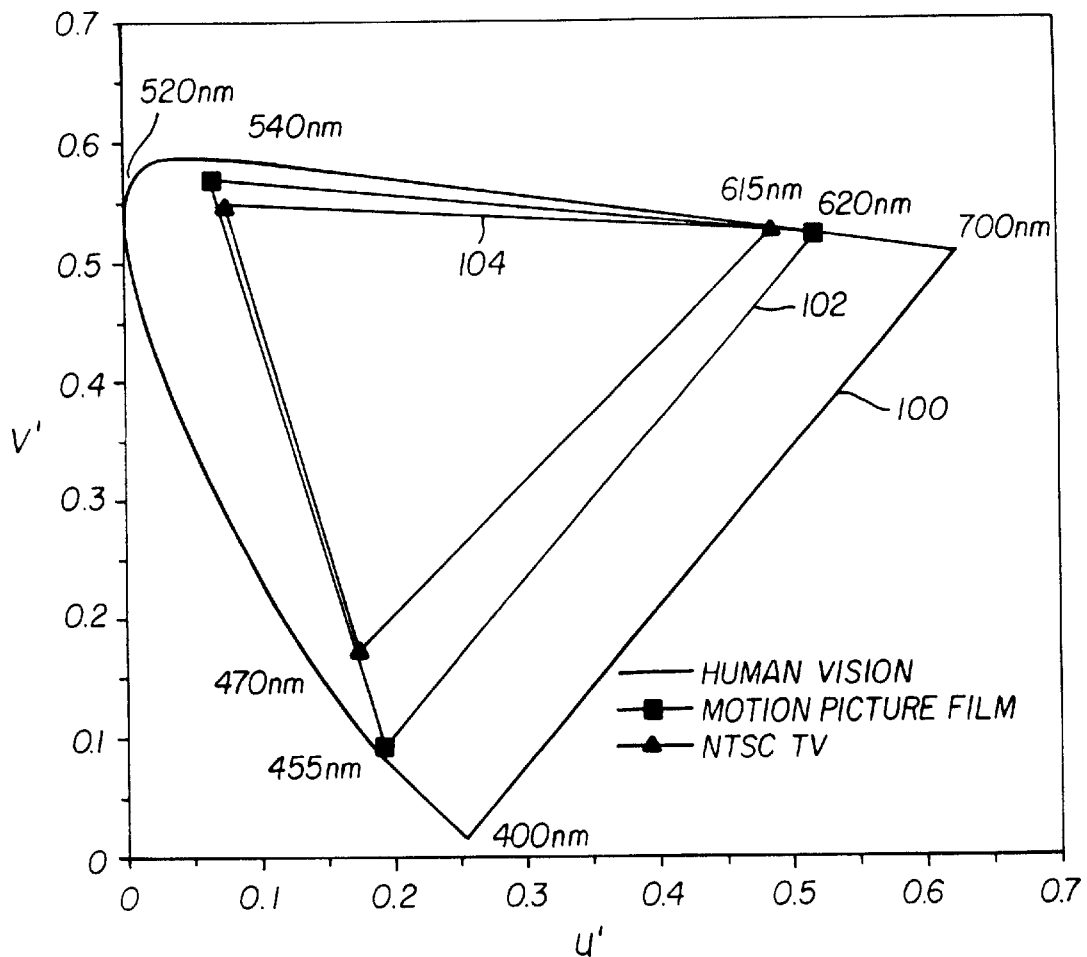
FIG. 1 is a graph showing conventional color gamut representation for NTSC TV and conventional motion picture film.

Referring back to the gamut mapping arrangement shown in FIG. 1, it is instructive to mention that a basic strategy for expanding the gamut of a display is to pick color sources that are on or close to the horseshoe periphery. Lasers, because they provide spectrally pure, saturated sources, are advantageous for this purpose and are the spectrally pure light sources of the preferred embodiment. Laser colors can be mapped directly to points lying on the horseshoe curve of visible gamut 100. Note that RGB LEDs can be used alternately as light sources that are substantially spectrally pure, however, LEDs are generally inferior to lasers with respect to both actual spectral quality and brightness.

Figure 2:
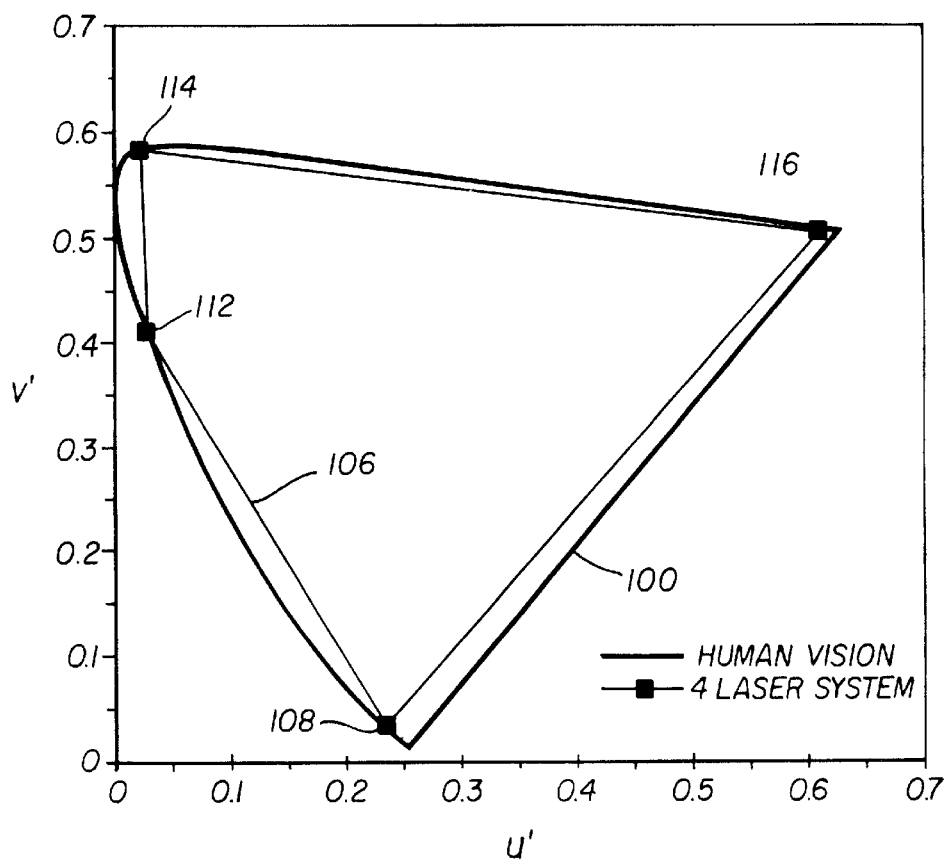
FIG. 2 is a graph showing an expanded color gamut using the method of the present invention.

Referring to FIG. 2, there is shown visible gamut 100 with a four-source gamut 106, as provided using the apparatus of the present invention. With the use of four lasers, the present invention allows a considerable portion of visible gamut 100 to be represented, as shown. In a preferred embodiment, the four vertices of four-source gamut 106 are provided by the following gas lasers, with the corresponding vertex indicated in FIG. 2:

Vertex 108—Helium-Cadmium at 442 nm

Vertex 112—Argon at 488 nm

Vertex 114—Argon at 515 nm

Vertex 116—Krypton at 647 nm

Of course, different lasers or other spectrally pure and bright light sources having different wavelengths could be selected, with appropriate shifting of one or more of vertices 108, 112, 114, 116 and corresponding adjustment to the shape of four-source gamut 106.

Figure 3:
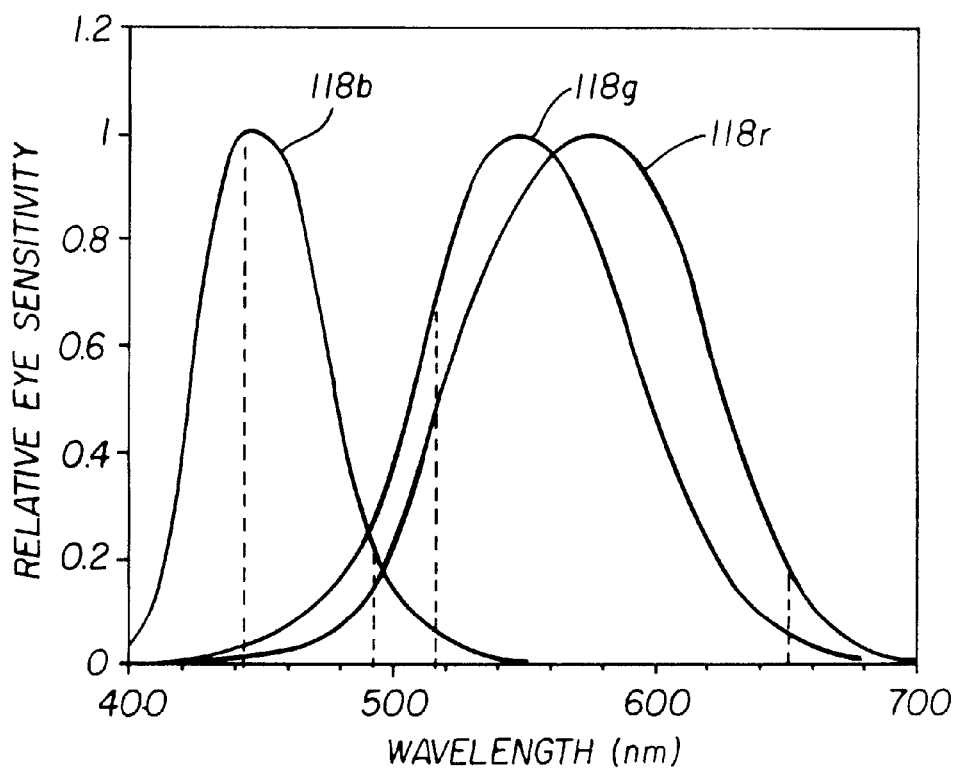
FIG. 3 is a graph showing the cone sensitivity of the human eye relative to wavelength.

The selection of optimal light source wavelengths depends upon which portions of visible gamut 100 need to be within the range of the projection apparatus. A key factor in this consideration is human-eye response. Referring to FIG. 3, there is shown the normalized sensitivity of the three types of color receptors (cones) in the retina. Blue response is indicated by a blue sensitivity curve 118b; red response by a red sensitivity curve 118r; and green response by a green sensitivity curve 118g. Dotted vertical lines indicate the four laser wavelengths noted above for vertices 108, 112, 114, and 116 in FIG. 2. Note that the blue response is reasonably well separated, while there is considerable overlap of the red and green receptors, allowing considerable discrimination of colors in this region, based on the proportions of green and red. It is instructive to emphasize that the goal in color projection is to elicit an eye-brain color response that is as nearly identical to that caused by the original scene content as possible. For example, the original scene object may include bluish-green seawater, which reflects colors within the solar spectrum. Projection provides the same eye-brain response of the scene content, as closely as possible. While this can be accomplished using an appropriate combination of blue and green sources, the green source can unintentionally stimulate the eye's red receptor, as is suggested in FIG. 3. For this reason, alternate use of a blue-green light source may be preferable for such scene content. The impact of this choice on perceived color gamut is best visualized graphically using the CIE chromaticity diagram, such as those of FIGS. 1 and 2. The selection of a suitable fourth spectrally pure light source expands the color gamut in that direction. Based on the chromaticity diagrams of FIGS. 1 and 2 and on the characteristic response of FIG. 3, it can be seen that, while there would be little advantage, for example, in selecting multiple lasers from the yellow and orange wavelengths, there could be substantial benefits in selecting an additional laser having a color in the blue-green wavelength. Another suitable alternative may be selection of a laser having a wavelength in the yellow-green color range.

Figure 4A:
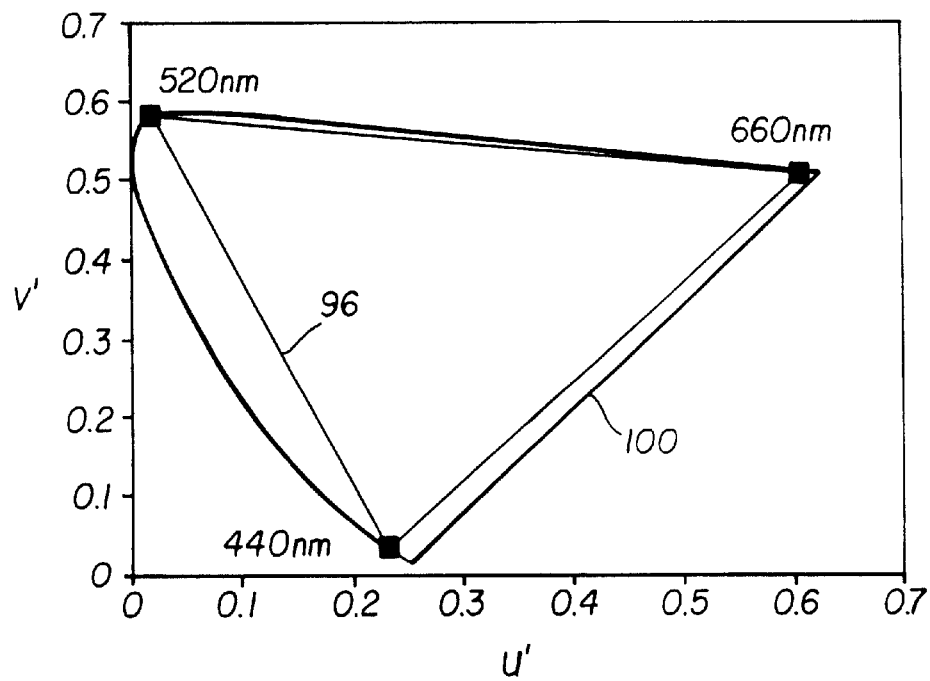
FIG. 4a shows the color gamut using only three lasers.
Figure 4B:
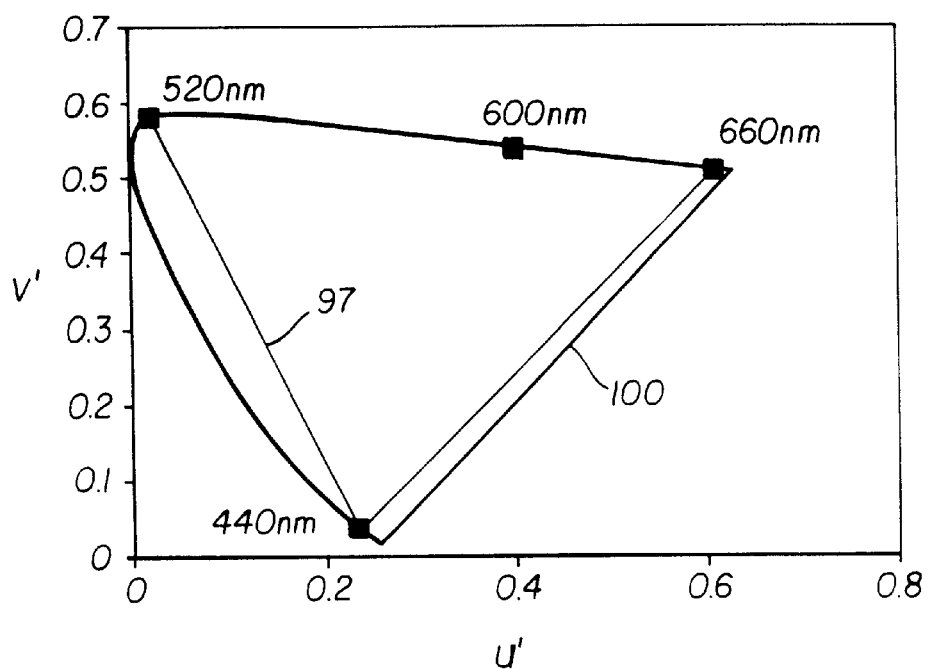
FIG. 4b shows the gamut increase that results from selecting orange as the fourth color laser.
Figure 4C:
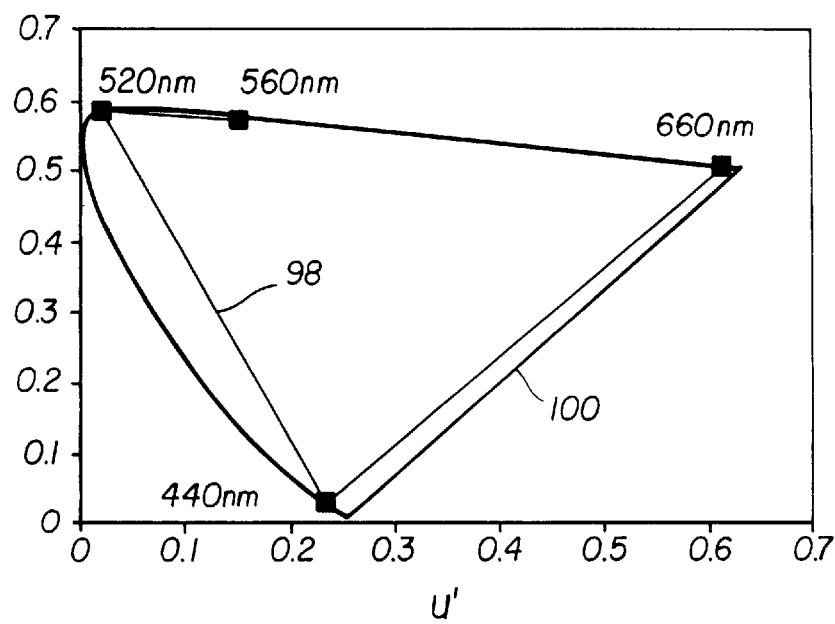
FIG. 4c shows the gamut increase that results from selecting yellow-green as the fourth color laser.
Figure 4D:
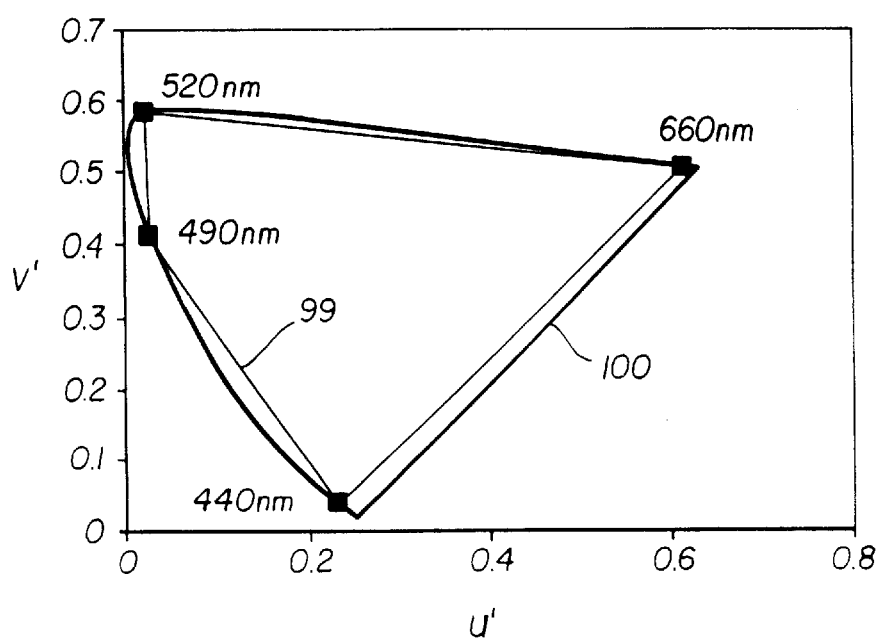
FIG. 4d shows the gamut increase that results from selecting blue-green as the fourth color laser.

FIGS. 4a–4d indicate, using a chromaticity diagram, how a fourth laser color might be selected to provide optimal improvement in color gamut. The goal is to increase the area bounded by the color gamut polygon as much as possible. FIG. 4a shows the extent of color gamut available using three lasers at nominal wavelengths of 440 nm, 520 nm, and 660 nm to approximate visible gamut 100 using an RGB laser gamut 96. In comparison with phosphor-based NTSC TV gamut 104 in FIG. 1, there is a considerable increase in gamut with the use of spectrally pure lasers. FIG. 4b shows what happens with the addition of an orange laser at 600 nm. There is barely any improvement in an orange-enhanced gamut 97 when compared with RGB laser gamut 96 since the red-green line of orange-enhanced gamut 97 lies almost coincident with visible gamut 100 in this region. Likewise, adding a fourth laser color as yellow-green at 560 nm as shown in FIG. 4c provides minimal increase in a yellow-green enhanced gamut 98 over RGB laser gamut 96 in FIG. 4a. In contrast, placing the fourth laser wavelength at 490 nm in the blue-green region, as is shown in FIG. 4d, provides a significant increase in a blue-green enhanced gamut 99 over RGB laser gamut 96 in FIG. 4a. RGB laser gamut 96 lacks blue-green. Therefore, use of an additional color in the blue green region has the most substantial impact on gamut. The green wavelength for the examples of FIGS. 4a–4d was arbitrarily picked at 520 nm. If this wavelength were more yellow-green, such as at 540 nm or 550 nm for example, the best choice for the fourth blue-green color might be closer to 500 nm to optimize the area of blue-green enhanced gamut 99. Similarly, further addition of a fifth laser at 460 nm could expand the gamut even further. Using this technique, a blue-green enhanced gamut 99 could be successively improved by the selective addition of more spectrally pure colors. However, it must also be observed that as more and more colors are added, the increased complexity and cost of the system may outweigh the advantages of an expanded color gamut. Moreover, color differences may be less and less striking when continuing such a process gives diminishing returns. Some practical limitations must be acknowledged.

Preferred Embodiment for Projection System 10

Figure 5:
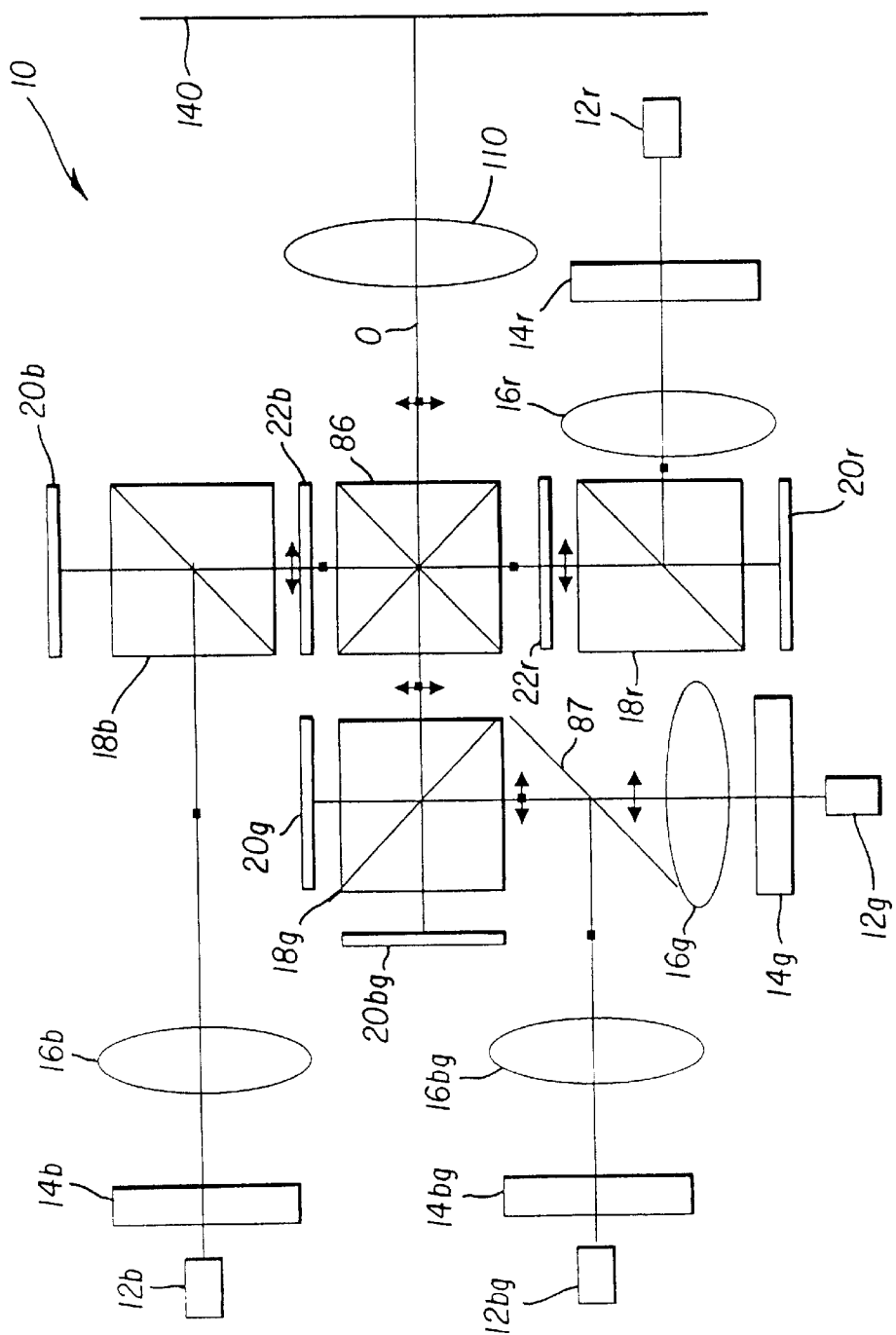
FIG. 5 is a schematic block diagram showing a four-color projection system using four spatial light modulators.

Referring to FIG. 5, there is shown one embodiment of a projection system 10 of the present invention, having a modulation path for each of four component colors. In FIG. 5, the color of each modulation path is indicated with an appended letter where necessary, as follows: r for components in the red modulation path, g for components in the green path, b for components in the blue path, and bg for components in the blue-green or other modulation path. For the purpose of the following description, however, the appended letter is omitted, except where necessary to distinguish activity distinctive to a particular color path. To represent the polarization orientation, the standard method is used where a double headed arrow means "in the plane of the paper" and a dot symbolizes "perpendicular to the plane of the paper." Each color path has a separate spatial light modulator 20 and a separate light source 12, with additional light conditioning and polarization handling components, as necessary. In the preferred embodiment, spatial light modulator 20 is a reflective LCD.

The basic operation of each light modulation path can be most easily traced by following light in the blue or red modulation paths. Light source 12 provides the source illumination that is modulated. Uniformizing optics 14 and a telecentric condenser lens 16, which may be an individual lens but is more likely a set of lenses, provide essentially telecentric light to a polarizing beamsplitter 18. Polarizing beamsplitter 18 transmits light having an unwanted polarization state and directs light of the intended polarization state as incident light to spatial light modulator 20. Spatial light modulator 20, using selective, variable rotation of light polarization for each individual pixel, as is well known in the imaging arts, modulates the incident light to provide a modulated color beam. In the red and blue paths, an additional half waveplate 22 provides a necessary polarization rotation for compatibility with modulated light from other color paths. Polarizing beamsplitter 18 could be a standard prism-based beamsplitter or could be a wire grid beamsplitter, as disclosed in U.S. Pat. No. 6,122,103 (Perkins et al.).

An X-cube 86 acts as a dichroic combiner, combining light from three input axes to provide modulated multicolor light as output along a common axis O to a projection lens 110, which projects the image formed by projection system 10 onto a display surface 140. In a preferred embodiment, X-cube 86 accepts s-polarized red and blue light, but can pass either s- or p-polarized light in the green and blue-green colors.

Still referring to FIG. 5, there are some notable differences in light handling in the modulation paths for green and blue-green color. Blue-green light source 12bg is s-polarized with respect to polarization beamsplitter 18g. Dichroic mirror 87 and polarization beamsplitter 18g reflect the s-polarized light as incident light to spatial light modulator 20bg. Modulated blue-green light from spatial light modulator 20bg becomes p-polarized and is then transmitted through polarization beamsplitter 18g to X-cube 86 for recombination and projection.

In the green color modulation path, light source 12g emits light that is p-polarized with respect to polarization beamsplitter 18g. The incident unmodulated light beam from light source 12g is transmitted through dichroic mirror 87 and enters polarization beamsplitter 18g. Polarization beamsplitter 18g transmits the p-polarized light as incident light to spatial light modulator 20g. Modulated light from spatial light modulator 20g is now s-polarized and is then reflected by polarization beamsplitter 18g to X-cube 86 for recombination and projection. Note that spatial light modulators 20g and 20bg are at alternate sides of polarization beamsplitter 18g, taking advantage of orthogonally polarized green and blue-green beams. X-cube 86 transmits both colors, green and blue-green, having orthogonal polarizations, to projection lens 87. A typical x-cube 86 must have s-polarized light in the red and blue channels but will accept either polarization in the "green" channel. In this case, the "green" channel is designed to pass both green and blue-green beams which are orthogonally polarized.

Figure 8A:
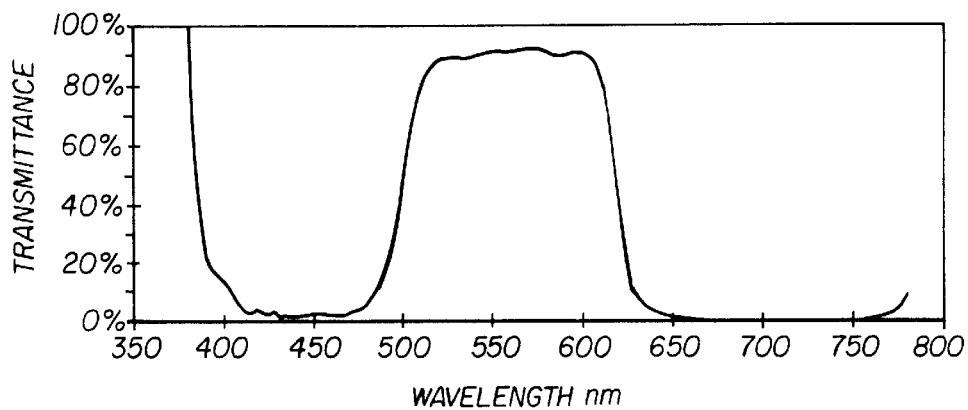
FIGS. 8a and 8b are graphs showing the transmittance of an X-cube color combiner.
Figure 8B:
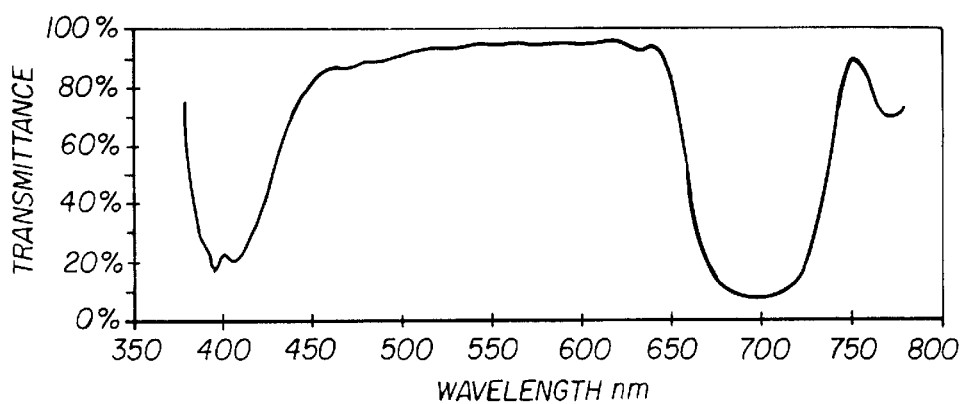

Referring to the graph of FIG. 8a, there is shown a plot of the efficiency of X-cube 86 for near-normal incidence light that is s-polarized. The wavelength of interest is blue-green light at approximately 490 nm. Note from FIG. 8a that, for s-polarized light, X-cube 86 is less than 50% efficient at 490 nm, whereas at the wavelength of green light, approximately 515–530 nm, X-cube 86 is nearly 90% efficient. Compare this behavior with the performance of X-cube 86 for p-polarized light as shown in FIG. 8b. For p-polarized blue-green light at 490 nm, X-cube 86 is nearly 90% efficient; for p-polarized green light, X-cube 86 is nearly 95% efficient. Therefore, from the perspective of light efficiency, there is clearly an advantage to the arrangement of FIG. 5, where modulated blue-green light has p-polarization and modulated green light has s-polarization.

Lasers are typically plane polarized and monochromatic. This inherent polarization results in a large efficiency boost over lamp sources that require a dichroic filter and a polarizer in order to be used. Dichroic filters are typically 80 to 85% transmitting and polarizers are typically only 35 to 40% transmitting. Therefore, when providing polarized light, a lamp based projector is about 3.5 times as lossy as a laser projector. Furthermore, monochromaticity means that the primaries are saturated colors and lie directly on the "horse-shoe" periphery, providing the largest possible color gamut.

The preferred embodiment of FIG. 5 admits a number of alternative types of components for performing the various light conditioning, modulation, and polarization handling functions. As stated above, light source 12 is preferably a laser. Available lasers at convenient wavelengths include gas lasers, dye lasers, and diode pumped solid state lasers (DPSS). Other types of light sources could be used, such as LEDs, for example. For use with an LCD spatial light modulator 20, light source 12 must have a high degree of spectral purity, high brightness level, and correct polarization state.

Uniformizing optics can include any of a variety of lenslet arrays, integrating bar, or other optical components suitable for providing illumination over a sufficiently wide field for spatial light modulator 20. Polarization beamsplitters can be standard McNeille prisms, wire-grid polarization beamsplitters, or other suitable devices.

DMD or other spatial light modulator devices such as transmissive LCDs could be employed as spatial light modulator 20, with the necessary changes to illumination and support components, using techniques well known in the imaging arts. Projection lens 110 and display surface 140 are selected to work together for optimal projection results.

Figure 9:
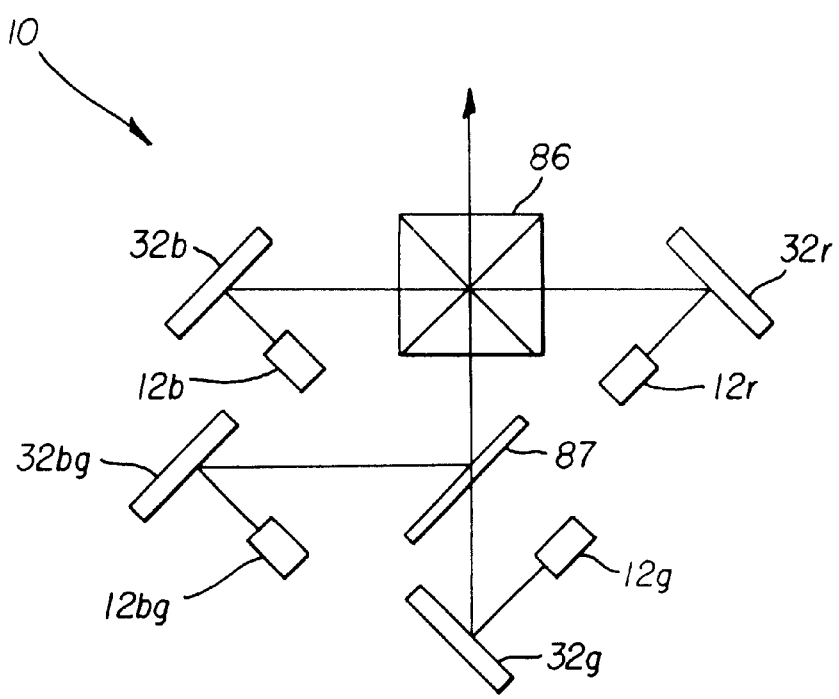
FIG. 9 is a schematic block diagram showing an alternate embodiment using DMD spatial light modulators.

Referring to FIG. 9, there is shown an embodiment of projection system 10 using four modulation devices: a DMD spatial light modulator, red light path 32r, a DMD spatial light modulator, green light path 32g, a DMD spatial light modulator, blue light path 32b, and a DMD spatial light modulator, blue-green light path 32bg. Here again, the green and blue-green modulated light are directed onto a single axis for transmission through X-cube 86. A projection system 10 using transmissive LCDs would use a similar arrangement for directing green and blue-green modulated light onto a common axis for transmission through X-cube 86.

It would also be possible to omit X-cube 86 or other color-combining component and to project each modulated colored light beam onto display surface 140 through a separate projection lens. However, such an arrangement can be considerably more cumbersome and costly.

Alternate Embodiment Using Sequential Color

Figure 6:
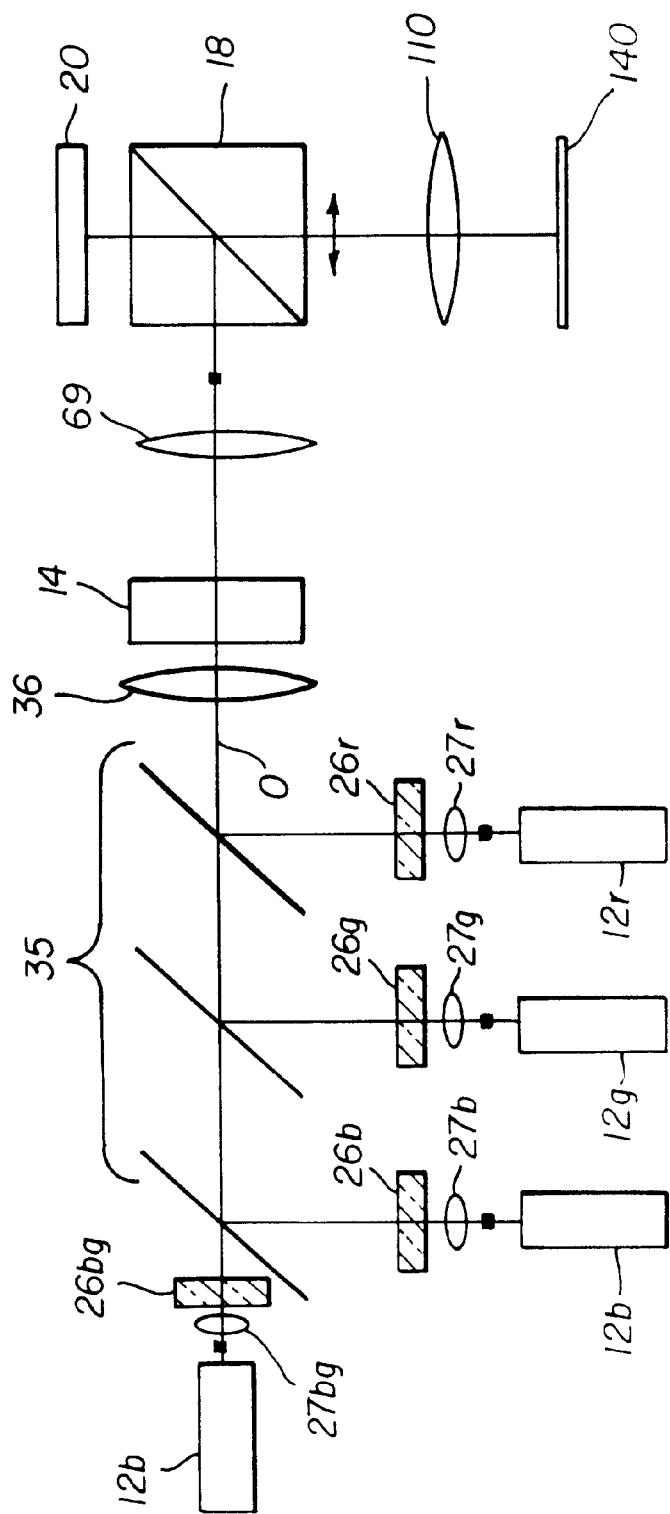
FIG. 6 is a schematic block diagram showing a four-color projection system using sequential-color modulation of a single spatial light modulator.

Referring to FIG. 6, there is shown an alternate embodiment in which sequential imaging is used for each of four colors. As in FIG. 5, parallel organization of components is used, with appended r, g, b, or bg for components specific to each color path. In each color path, light source 12 provides the source illumination beam for modulation. In a. preferred embodiment, each light source 12 is s-polarized with respect to polarization beamsplitter 18. A lens 27, in cooperation with an output lens 36, acts as a beam expander. A fast shutter 26. is provided for control of the light beam from each light source 12. In a preferred embodiment, shutter 26 is an acousto-optic modulator having a high extinction ratio, in excess of 1000:1. There are four shutters shown in FIG. 6, one for each color: a shutter, red light path 26r; a shutter, green light path 26g; a shutter, blue light path 26b and a shutter, blue-green light path 26bg. The timing and sequencing of shutters 26r, 26g, 26b, and 26bg are controlled by a control logic processor (not shown). A dichroic combiner 35 directs the beam from any light source 12 on its individual axis into common optical axis O. Output lens 36 directs the illumination beam, which is conditioned by uniformizing optics 14, typically a lenslet array or integrator bar, to provide a uniform illumination field. A telecentric condenser lens 69 directs the uniformized illumination beam to polarizing beamsplitter 18 and to spatial light modulator 20. Spatial light modulator 20, an LCD in the preferred embodiment, modulates the illumination beam to provide a modulated light beam that is then projected onto display surface 140 by projection lens 110.

Sequential imaging of each of the component colors is required for an embodiment using fewer spatial light modulators 20 than there are light sources 12, as is shown in FIG. 6. Using techniques well known in the digital imaging arts, individual modulated color images are sequentially projected at a high enough rate for perception of full color images. The refresh rate for sequential imaging must exceed the perceptible range of visible flicker. Typically, speeds of sixty images per second or greater are used.

Shutters 26 are fast, high extinction ratio shutters. This allows them to be turned on independently. Shutters 26 help to eliminate color crosstalk effects that plague designs using the conventional lamp and filter wheel approach. This crosstalk occurs, for example, during transitions between color filters, before the full set of data is provided for the next color. In the conventional approach, shutters having the necessary fast rise and fall time and large extinction ratio for minimizing color crosstalk would be difficult and costly to design.

Shutters 26r, 26g, 26b, and 26bg are controlled such that each shutter 26r, 26g, 26b, and 26bg is open during a separate time interval, so that only one color at a time is incident at spatial light modulator 20. With this arrangement, it may also be desirable to disable one or more colors, depending on scene color content for example.

Alternate Embodiment Using Scanned Raster Beam

Figure 7:
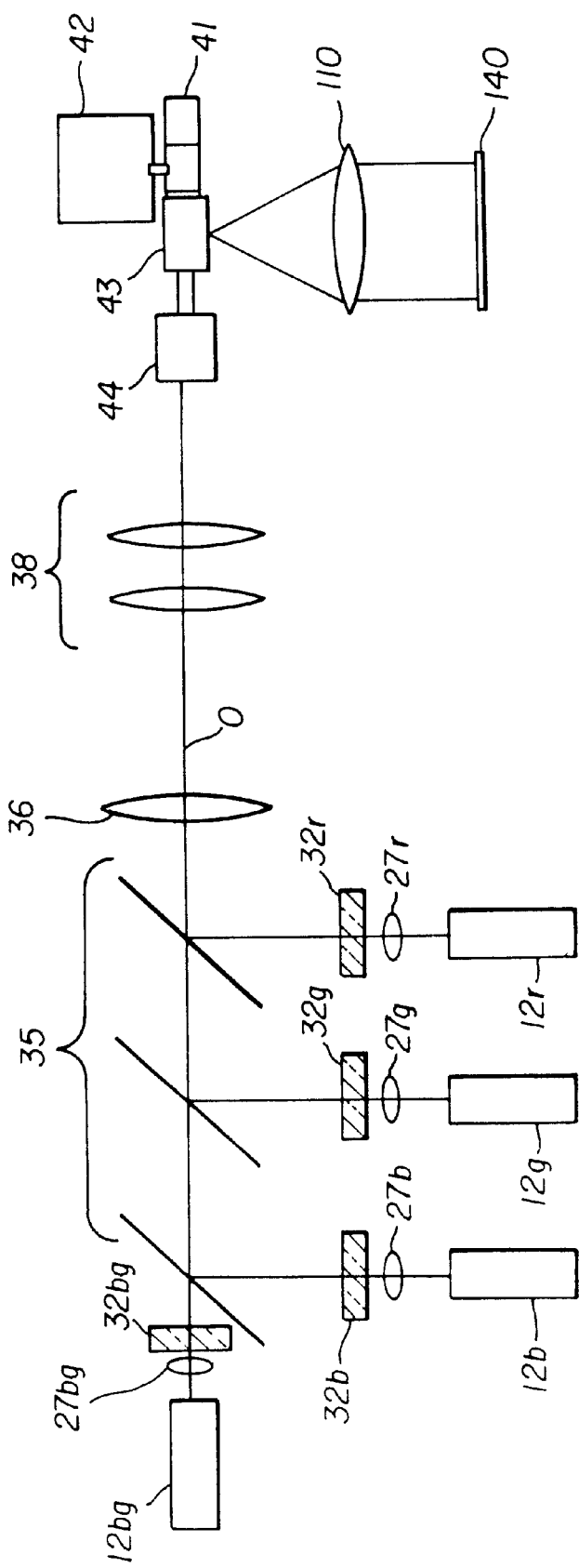
FIG. 7 is a schematic block diagram showing a four-color laser projection system with Acousto-Optical Modulators (AOMs), wherein the resultant modulated beams are raster scanned using a polygon scanner and galvanometer.

Referring to FIG. 7, there is shown another alternate embodiment employing a scanning polygon mirror 41. Light sources 12r, 12g, 12b, and 12bg are disposed in a similar arrangement to that shown in FIG. 6. In each light path, light source 12 directs light through lens 27 for providing an illumination beam. Modulation of each light source is performed by a modulator 32r, 32g, 32b, or 32bg respectively, which may be an acousto-optic modulator, electro-optical modulator, or other suitable device for modulating transmitted light. In the embodiment of FIG. 7, dichroic combiner 35 combines the modulated light from each light path to provide composite color modulated light on common axis O. Output lens 36 then directs the composite color modulated light through beam-shaping optics 38, which provide the composite color modulated light as a focused modulated light beam to a polygon mirror 41. Using scanning techniques well known in the laser scanner arts, a motor 42 spins polygon mirror 41 to provide a high-speed horizontal scan that deflects the focused modulated light beam to form a scanned raster beam. A galvanometer-driven mirror 43, driven by a galvanometer actuator 44, provides vertical deflection for the scanned raster beam. Projection lens 110 directs the scanned raster beam to display surface 140.

Alternate Embodiments

The embodiments described above with reference to FIGS. 5, 6, and 7 are directed primarily to large-scale projection applications, such as movie theater environments, for example. Such large-scale applications require light sources 12 to provide high brightness levels with highly saturated color. For such applications, lasers provide a suitable solution for light sources 12. However, the present invention admits other types of light source 12, particularly where high power is not a requirement. For example, in smaller projector or TV applications, LEDs may provide a suitable solution for light source 12. Referring back to FIG. 2, LEDs would not provide the spectral purity of narrow-band lasers and therefore would not be capable of providing as large a color gamut. However, narrow-band LEDs can provide substantially monochromatic color such that corresponding vertices in a gamut mapping such as is shown in FIG. 2 could closely approximate the positions on visible gamut 100 curve that are achievable using lasers.

It is worthwhile to note that, while the preferred and alternate embodiments described above show the use of four colors, the present invention can be extended to use five, six, or more light sources 12. However, it can be appreciated that such arrangements would not only require compact packaging of optical components, but also would require considerable computational complexity in determining how to represent any specific color in the color gamut thus obtained.

It should also be noted that there might be imaging conditions where fewer than four colors are needed for a specific scene or image. With reference to FIG. 5, for example, it may be beneficial to temporarily disable blue-green spatial light modulator 20bg for some types of scenes. A logic component (not shown) might analyze scene content data to determine when to switch blue-green spatial light modulator 20bg into or out of the scene.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

Thus, what is provided is an apparatus and method for projection of high-resolution motion-picture images from digital data, wherein an improved color gamut can be obtained.

| PARTS LIST | |
|---|---|
| 10. | Projection system |
| 12. | Light source |
| 12r. | Red light source |
| 12g. | Green light source |
| 12b. | Blue light source |
| 12bg. | Blue-green light source |
| 14. | Uniformizing optics |
| 14r. | Uniformizing optics, red light path |
| 14g. | Uniformizing optics, green light path |
| 14b. | Uniformizing optics, blue light path |
| 14bg. | Uniformizing optics, blue-green light path |
| 16. | Condenser lens |
| 16r. | Condenser lens, red light path |
| 16g. | Condenser lens, green light path |
| 16b. | Condenser lens, blue light path |
| 16bg. | Condenser lens, blue-green light path |
| 18. | Polarizing beamsplitter |
| 18r. | Polarizing beamsplitter, red light path |
| 18g. | Polarizing beamsplitter, green light path |
| 18b. | Polarizing beamsplitter, blue light path; |
| 20. | Spatial light modulator |
| 20r. | Spatial light modulator, red light path |
| 20g. | Spatial light modulator, green light path |
| 20b. | Spatial light modulator, blue light path |
| 20bg. | Spatial light modulator, blue-green light path |
| 22. | Half waveplate |
| 22r. | Half waveplate, red light path |
| 22b. | Half waveplate, blue light path |
| 26. | Shutter |
| 26r. | Shutter, red light path |
| 26g. | Shutter, green light path |
| 26b. | Shutter, blue light path |
| 26bg. | Shutter, blue-green light path |
| 27. | Lens |
| 27r. | Lens, red light path |
| 27g. | Lens, green light path |
| 27b. | Lens, blue light path |
| 27bg. | Lens, blue-green light path |
| 32r. | DMD spatial light modulator, red light path |
| 32g. | DMD spatial light modulator, green light path |
| 32b. | DMD spatial light modulator, blue light path |
| 32bg. | DMD spatial light modulator, blue-green light path |
| 35. | Dichroic combiner |
| 36. | Output lens |
| 38. | Beam-shaping optics |
| 41. | Polygon mirror |
| 42. | Motor |
| 43. | Calvanometer-driven mirror |
| 44. | Galvanometer actuator |
| 69. | Condenser lens |
| 86. | X-cube |
| 87. | Dichroic mirror |
| 96. | RGB laser gamut |
| 97. | Orange-enhanced gamut |
| 98. | Yellow-green enhanced gamut |
| 99. | Blue-green enhanced gamut |
| 100. | Visible gamut |
| 102. | Motion picture film gamut |
| 104. | NTSC TV gamut |
| 106. | Four-source gamut |
| 108. | Vertex |
| 110. | Projection lens |
| 112. | Vertex |
| 114. | Vertex |
| 116. | Vertex |
| 118r. | Red sensitivity curve |
| 118g. | Green sensitivity curve |
| 118b. | Blue sensitivity curve |
| 140. | Display surface |

What is claimed is:
1. A color projection system comprising:
(a) a first light source for providing a first color beam;
(b) a first spatial light modulator for modulating said first color beam to provide a first modulated color beam on a first optical axis;

(c) a second light source for providing a second color beam;

(d) a second spatial light modulator for modulating said second color beam to provide a second modulated color beam on a second optical axis;

(e) a third light source for providing a third color beam for transmission through a first color combiner;

(f) a third spatial light modulator for modulating said third color beam to provide a third modulated color beam;

(g) a fourth light source for providing a fourth color beam for reflection by said first color combiner;

(h) a fourth spatial light modulator for modulating said fourth color beam to provide a fourth modulated color beam;

(i) a polarizing beamsplitter for combining said third and fourth modulated color beams onto a third optical axis;

(j) a second color combiner for combining the light on said first, second, and third optical axes to form a multicolor modulated beam; and (k) a projection system for projecting said multicolor modulated beam.

2. A color projection system as in claim 1 wherein said first, second, third, and fourth spatial light modulators are reflective LCDs.

3. A color projection system as in claim 1 wherein said first, second, third, and fourth spatial light modulators are transmissive LCDs.

4. A color projection system as in claim 1 wherein said polarizing beamsplitter is a wire grid beamsplitter.

5. A color projection system as in claim 1 wherein said first, second, third, and fourth spatial light modulators are gated light valves.

6. A color projection system as in claim 1 wherein said first, second, third, and fourth spatial light modulators are electro-optic modulators combined with polygon scanners.

7. A color projection system as in claim 1 wherein said first, second, third, and fourth light sources are red, green, yellow-green, blue-green, or blue lasers.

8. A color projection system as in claim 1 wherein said first, second, third, and fourth light sources are selected from the group comprised of a red LED array, green LED array, blue-green LED array, yellow-green LED array, and blue LED array.

9. A color projection system as in claim 1 wherein said first, second, third, and fourth light sources are selected from a group comprised of laser, LED array, filtered xenon lamp, and tungsten lamp.

10. A color projection system as in claim 1 wherein said first color combiner is a dichroic combiner.

11. A color projection system as in claim 1 wherein said second color combiner is an X-prism.

12. A color projection system as in claim 1 wherein said second color combiner is a Philips prism.

13. A color projection system comprising:

(a) a first light source for providing a first color beam;

(b) a second light source for providing a second color beam;

(c) a third light source for providing a third color beam;

(d) a fourth light source for providing a fourth color beam;

(e) a color combiner for combining said first, second, third, and fourth color beams onto a common axis to form an illumination beam;

(f) a spatial light modulator for modulating said illumination beam to provide a modulated color beam; and (g) a projection system for projecting said modulated color beam.

14. A color projection system according to claim 13 wherein said first light source comprises a laser.

15. A color projection system according to claim 13 wherein said first light source comprises an LED array.

16. A color projection system according to claim 13 wherein said color combiner comprises a dichroic combiner.

17. A color projection system according to claim 13 wherein said spatial light modulator is a reflective LCD.

18. A color projection system according to claim 13 wherein said spatial light modulator is a transmissive LCD.

19. A color projection system according to claim 13 wherein said spatial light modulator is digital micromirror device.

20. A color projection system according to claim 13 wherein said spatial light modulator is a gated light valve.

21. A color projection system according to claim 13 wherein said spatial light modulator is an acousto-optical device.

22. A color projection system according to claim 13 further comprising a first shutter for controllably shuttering light from said first light source.

23. A color projection system according to claim 13 wherein said first shutter is an acousto-optical modulator.

24. A color projection system according to claim 13 further comprising a uniformizer for homogenizing said illumination beam.

25. A color projection system comprising:

(a) a first light source for providing a first color beam and a first modulator for modulating said first color beam to form a first modulated beam;

(b) a second light source for providing a second color beam and a second modulator for modulating said second color beam to form a second modulated beam;

(c) a third light source for providing a third color beam and a third modulator for modulating said third color beam to form a third modulated beam;

(d) a fourth light source for providing a fourth color beam and a fourth modulator for modulating said fourth color beam to form a fourth modulated beam;

(e) a color combiner for combining said first, second, third, and fourth modulated beams onto a common axis to form an illumination beam; and (f) a spinning polygon mirror for directing said illumination beam toward a projection system for projecting said modulated color beam toward a display surface.

26. A color projection system according to claim 25 wherein said first light source comprises a laser.

27. A color projection system according to claim 25 wherein said first light source comprises an LED array.

28. A color projection system according to claim 25 wherein said color combiner comprises a dichroic combiner.

29. A color projection system according to claim 25 wherein said first modulator is an acousto-optical modulator.

30. A color projection system according to claim 25 wherein said first modulator is an electro-optical modulator.

31. A color projection system comprising:

(a) a first light source for providing a first color beam;

(b) a first spatial light modulator for modulating said first color beam to provide a first modulated color beam on a first optical axis;

(c) a second light source for providing a second color beam;

(d) a second spatial light modulator for modulating said second color beam to provide a second modulated color beam on a second optical axis;

(e) a third light source for providing a third color beam;

(f) a third spatial light modulator for modulating said third color be am to provide a third modulated color beam;

(g) a fourth light source for providing a fourth color beam;

(h) a fourth spatial light modulator for modulating said fourth color beam to provide a fourth modulated color be am;

(i) a first color combiner for combining said third and fourth modulated color beams onto a third optical axis;

(j) a second color combiner for combining the light on said first, second, and third optical axes to form a multicolor modulated beam; and (k) a projection system for projecting said multicolor modulated beam toward a display surface.

32. A color projection system as in claim 31 wherein said first color combiner is a dichroic combiner.

33. A color projection system as in claim 31 wherein said second color combiner is an X-prism.

34. A color projection system as in claim 31 wherein said second color combiner is a Philips prism.

35. A color projection system as in claim 31 wherein said first spatial light modulator is a DMD.

36. A color projection system as in claim 31 wherein said first spatial light modulator is a transmissive LCD.

37. A color projection system comprising:

(a) a first light source for providing a first color beam;

(b) a first spatial light modulator for modulating said first color beam to provide a first modulated color beam on a first optical axis;

(c) a second light source for providing a second color beam;

(d) a second spatial light modulator for modulating said second color beam to provide a second modulated color beam on a second optical axis;

(e) a third light source for providing a green color beam for transmission through a first color combiner, said green color beam having p-polarity with respect to a second color combiner;

(f) a third spatial light modulator for modulating said green color beam to provide a green modulated color beam;

(g) a fourth light source for providing a blue-green color beam for reflection by said first color combiner, said blue-green color beam having s-polarity with respect to said second color combiner;

(h) a fourth spatial light modulator for modulating said blue-green color beam to provide a blue-green modulated color beam;

(i) a polarizing beamsplitter for combining said green and said blue-green modulated color beams onto a third optical axis;

(j) said second color combiner combining the light on said first, second, and third optical axes to form a multicolor modulated beam; and (k) a projection system for projecting said multicolor modulated beam.

38. A method for projecting a color image, comprising:

(a) providing a first color beam from a first light source;

(b) providing a second color beam from a second light source;

(c) providing a third color beam from a third light source;

(d) providing a fourth color beam from a fourth light source;

(e) directing said first, second, third, and fourth color beams onto a common axis to form an illumination beam;

(f) modulating said illumination beam at a spatial light modulator to provide a modulated beam; and (g) projecting said modulated beam toward a display surface.

39. A method for projecting a color image according to claim 38 further comprising the step of uniformizing said illumination beam.

40. A method for projecting a color image according to claim 38 wherein said first light source is a laser.

41. A method for projecting a color image according to. claim 38 wherein the step of directing said first, second, third, and fourth color beams onto a common axis uses a dichroic combiner.

42. A method for projecting a color image according to claim 38 wherein the step of directing said first, second, third, and fourth color beams onto a common axis comprises the step of combining said third and fourth color beams onto an intermediate axis, then directing said intermediate axis toward said common axis.

43. A method for projecting a color image according to claim 38 wherein said spatial light modulator is a reflective LCD.

44. A method for projecting a color image according to claim 38 wherein the step of providing said third color beam occurs during a first time period and the step of providing said fourth color beam occurs during a second time period and wherein said first and second time periods are distinct.

45. A method for projecting a color image according to claim 38 wherein the step of providing said first color beam further comprises the step of operating a shutter.

46. A method for projecting a color image, comprising:

(a) providing a first color beam from a first light source;

(b) providing a second color beam from a second light source;

(c) providing a green color beam from a green light source, said green color beam having p-polarity with respect to a color combiner;

(d) providing a blue-green color beam from a blue-green light source, said blue-green color beam having s-polarity with respect to said color combiner;

(e) directing said first, second, third, and fourth color beams onto a common axis to form an illumination beam;

(f) modulating said illumination beam at a spatial light modulator to provide a modulated beam; and (g) projecting said modulated beam toward a display surface.

* * * * *